United States Patent [19]
Rudell et al.

[11] Patent Number: 5,263,714
[45] Date of Patent: Nov. 23, 1993

[54] GAME WITH SELECTIVE MEMBERS FOR RELEASING WATER

[75] Inventors: Elliot Rudell, 1619 Gramercy Ave., Torrance, Calif. 90501; George T. Foster, Signal Hill; Ian Osborne, Manhattan Beach, both of Calif.

[73] Assignee: Elliot Rudell, Torrance, Calif.

[21] Appl. No.: 927,927

[22] Filed: Aug. 7, 1992

[51] Int. Cl.$^5$ .............................................. A63F 9/00
[52] U.S. Cl. ................................. 273/138 R; 273/457; 446/176
[58] Field of Search ........................ 273/138 R, 457; 446/176, 199

[56] References Cited

U.S. PATENT DOCUMENTS

| | | | |
|---|---|---|---|
| 3,907,301 | 9/1975 | Adcock et al. | 273/287 |
| 4,113,259 | 9/1978 | Sands | 273/249 |
| 4,813,680 | 3/1989 | Rudell et al. | 273/138 R |
| 4,881,733 | 11/1989 | Rehkemper et al. | 273/138 R |
| 4,991,847 | 12/1991 | Rudell et al. | 273/138 R |
| 5,121,927 | 6/1992 | Jones | 273/287 |

Primary Examiner—Benjamin H. Layno
Attorney, Agent, or Firm—Blakely, Sokoloff, Taylor & Zafman

[57] ABSTRACT

A ground level water toy that can be connected to a garden hose and releases water when a player pushes down one preselected control member from a number of control members extending from the toy. The toy has a housing with an inlet that can be coupled to the garden hose, an outlet that can splash the players with water, and an inner fluid passage that provides fluid communication between the inlet and the outlet. The flow of water is controlled by a valve within the housing. The toy has a trigger which is coupled to the valve by a shaft assembly. The trigger normally maintains the shaft assembly in a down position, so that the valve is closed. When the trigger is activated, the shaft moves to an up position, which opens the valve and allows water to flow from the housing outlet.

The toy has a plurality of control members that extend from the housing and are adapted to be moved between a first position and a second position. One of the control members is aligned with the trigger, so that when the control member is moved into the second position, the trigger is depressed and the shaft assembly is allowed to move into the up position.

15 Claims, 3 Drawing Sheets

U.S. Patent    Nov. 23, 1993    Sheet 1 of 3    5,263,714
FIG. 1
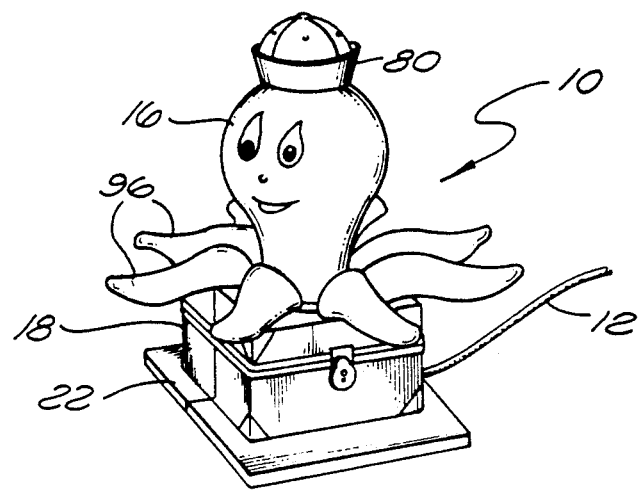
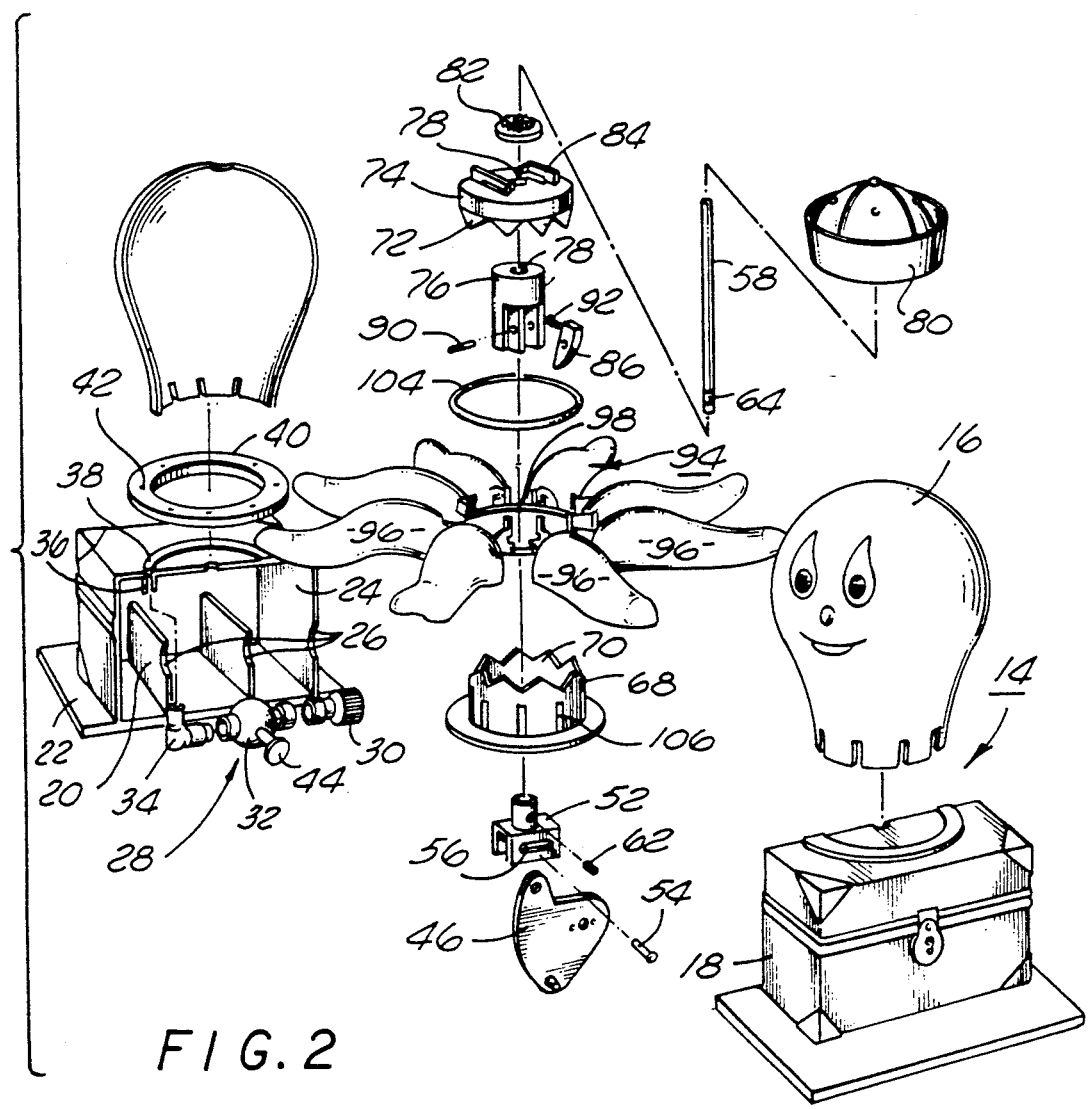
FIG. 2

GAME WITH SELECTIVE MEMBERS FOR RELEASING WATER

BACKGROUND OF THE INVENTION

1. Field of the Invention

The present invention relates to a water toy that can be connected to a garden hose and releases water when a player pushes one preselected control member from a number of control members extending from the toy.

2. Description of Related Art

Water toys, ranging from water guns to water slides, have become increasingly popular over the years. Kids enjoy the dual nature of becoming wet while operating the toys. It is particularly amusing when the toy releases water in a somewhat random fashion, so that the players do not know when, or who will get splashed with water.

U.S. Pat. Nos. 4,890,838 and 4,991,847 issued to Rudell et al, disclose water novelties sold by Lewis Galoob Toys under the trademark SPLASH OUT. The Rudell toy includes a two-piece ball that is molded with slots in an outer housing. A water balloon is loaded into the ball and a mechanical timer is set. The players throw the ball back and forth while the timer is winding down. When the timer runs out, a spring loaded pin is activated to puncture the balloon and release water onto the player holding the ball.

U.S. Pat. No. 4,881,733 issued to Rehkemper et al, discloses another water release toy ball. The Rehkemper device includes a plastic housing that is attached to a water balloon. The housing also has means for puncturing the balloon at random or predetermined time intervals. The balloon and housing are tossed about between two or more players, until the balloon is ruptured and the water is released onto one of the players.

U.S. Pat. No. 4,813,680 issued to Rudell et al, discloses a toy that was sold by Mattel, Inc. under the trademark WET HEAD. WET HEAD comprises a hat-shaped housing that has a reservoir of water and a plurality of detachable sticks extending from the side of the housing. One of the sticks functions as a valve for the reservoir, such that water is released from the housing when the selected stick is pulled out of the device. The game is played by filling the reservoir, donning the hat and then pulling out one of the sticks. The hat is passed around to different players until someone pulls out the stick that releases the water. The water falls onto the player's head, thereby penalizing the player for pulling the wrong stick. Although WET HEAD is fun to play, the reservoir is limited in capacity and the toy requires that the players don, remove and transfer the toy after each stick is pulled from the hat. The toy is therefore slow and cumbersome to play.

SUMMARY OF THE INVENTION

The present invention is a ground level water toy that can be connected to a garden hose and releases water when a player pushes down one preselected control member from a number of control members extending from the toy. The toy has a housing with an inlet that can be coupled to the garden hose, an outlet that can splash the players with water, and an inner fluid passage that provides fluid communication between the inlet and the outlet. The flow of water is controlled by a valve within the housing. The toy has a trigger which is coupled to the valve by a shaft assembly. The trigger normally maintains the shaft assembly in a down position so that the valve is closed. When the trigger is activated, the shaft moves to an up position, which opens the valve and allows water to flow from the housing outlet.

The toy has a plurality of control members that extend from the housing and are adapted to be moved between a first position and a second position. One of the control members is aligned with the trigger, so that when the control member is moved into the second position, the trigger is depressed and the shaft assembly is allowed to move into the up position.

The toy has a cap that is connected to the shaft assembly and extends from the housing when the valve is open. The players can reset the trigger and close the valve by merely pushing down the cap. The cap, shaft assembly and trigger can be rotated relative to the control members, so that the players can change which control member will release the water.

The game is played by first attaching the toy to a garden hose, placing the toy on the ground and turning on the water. The trigger is preset to prevent water from being released onto the players. All of the control members are set in the first position, wherein one of the control members is aligned with the trigger. Each player takes turns moving a single control member into the second position. The trigger is hidden from view so that the players can not tell which control member is aligned with the trigger.

The process of moving control members is repeated until one of the players picks the aligned member and releases water from the toy. The game is typically played with all of the players outside the reach of the water so that only the player moving the control member is splashed with the released water. After the water is released, the cap is pushed down to engage the trigger and close the valve. The shaft assembly can be rotated before the trigger is reset to change which control member is aligned with the trigger. The process of moving control members is then repeated.

Therefore it is an object of the present invention to provide a water toy that penalizes a player for making a wrong selection.

It is also an object of the present invention to provide a selective water release toy that can be placed on the ground.

It is also an object of the present invention to provide a selective water release toy that can be connected to a garden hose.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 1 is a perspective view of a water toy of the present invention;

FIG. 2 is an exploded view of the water toy of FIG. 1;

DETAILED DESCRIPTION OF THE INVENTION

Figure 3:
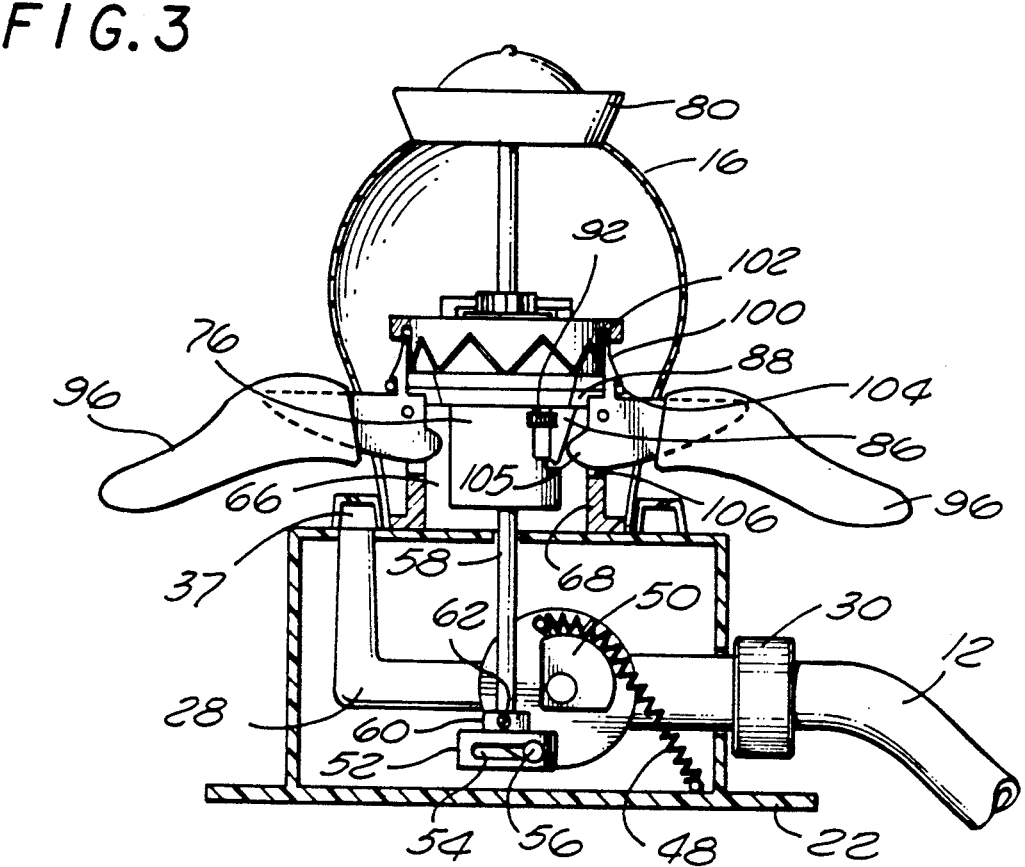
FIG. 3 is a cross-sectional view of the water toy of FIG. 1.

Referring to the drawings more particularly by reference numbers, FIG. 1 shows a water toy 10 of the present invention. In the preferred embodiment the toy 10 is shaped as an octopus with features and colors added to improve the overall appearance of the device. Although an octopus is shown and described, it is to be understood that the toy 10 can be constructed to simulate any object. The toy 10 is constructed to be attached to a garden hose 12 and placed in the middle of a yard. The octopus is typically placed on the ground, although it is to be understood that the toy 10 can be positioned on other support structures such as a table or chair.

FIGS. 2 and 3 show a preferred construction of the water toy 10. The toy 10 has a housing 14 that is preferably constructed from a molded plastic. The housing 14 may have an upper portion 16 shaped as an octopus head and a lower portion 18 shaped as a chest. The upper 16 and lower 18 portions are each preferably constructed from two pieces to improve the assembly process of the toy. Each lower portion 18 has a pair of plates 20 extending essentially perpendicular from the base 22 of the housing. The plates 20 and one wall 24 of the lower housing 16 each have a radial groove 26.

The plates 20 and wall 24 support a piping system 28 that is placed within the radial grooves 26. The piping system 28 includes an inlet coupler 30, a valve 32 and an elbow 34. The inlet 30 has an internal thread that can be connected to the garden hose 12. The elbow 34 couples the valve to a collar port 36. The collar port 36 provides fluid communication between the piping system 28 and a collar passage 37 formed by an annular groove 38 in the top of the lower housing 18, and a corresponding annular groove (not shown) in a collar 40 that is attached to the housing 14. The collar 40 has a plurality of openings 42 that allow water to flow from the collar passage. The openings 42 are preferably constructed as nozzles so that streams of water are released from the toy 10.

The valve 32 is constructed to control the flow of water through the piping system 28. The valve 32 is preferably a simple butterfly valve that can be rotated between an open position and a closed position. When the valve 32 is in the open position, water is allowed to flow through the piping system 28 and out of the openings 42. Rotating the valve to the closed position prevents fluid flow through the piping system 28.

Extending from the valve 32 is a knob 44 that is attached to a cam 46. Both the cam 46 and knob 44 are adapted to rotate and either open or close the valve 32. A first spring 48 is connected to the cam 46 and base plate 22 to bias the valve 32 into the open position. The cam 46 may have a radial hub 50 that guides the spring 48.

A cam follower 52 is connected to the cam 46 by a pin 54 that extends through a slot 56 in the follower 52. A shaft 58 is coupled to a collar portion 60 of the cam follower 52 by a set screw 62. The set screw 62 extends into a shaft groove 64 to secure the shaft 58 to the collar 60, while allowing the shaft 58 to rotate about its longitudinal axis. The pin 54 is adapted to move within the slot 56 of the cam follower 52, so that the shaft 58 can move in a vertical direction when the cam 46 is rotated.

The shaft 58 generally moves between an up position, which opens the valve 32, and a down position, which closes the valve 32.

The shaft 58 extends through an opening 66 in a lower gear carrier 68 which is attached to the lower housing 18. The lower carrier 68 has a plurality of sawtooth lower teeth 70 that can mate with a plurality of sawtooth upper teeth 72 which extend from an upper gear carrier 74. The sawtooth teeth prevent the shaft 58 from being rotated when in the down position.

The upper gear carrier 74 is connected to a trigger housing 76. Both the trigger housing 76 and the upper gear carrier 74 have clearance holes 78 that allow the shaft 58 to extend therethrough. The end of the shaft 58 is connected to a cap 80 located on top of the upper housing 16. The cap 80 is securely fastened to the shaft 58, so that any translational or rotational movement of the cap 80 is transmitted to the shaft 58. The toy 10 may also have a ratchet 82 attached to the shaft 58 and coupled to a pair of pawls 84 extending from the top of the upper gear carrier 74. The ratchet 82 allows the cap 80 to be rotated in the down position without damaging the remainder of the shaft assembly.

The shaft 58 is held in the down position by a trigger 86 which engages the underside of an inner shoulder 88 extending from the lower gear carrier 68. The trigger 86 is pivotally connected to the trigger housing 76 by a pin 90, which allows the trigger 86 to be rotated relative to the inner shoulder 88. A second spring 92 is connected to the trigger 86 and trigger housing 76, to bias the trigger 86 toward the inner shoulder 88.

A control member assembly 94 is coupled to the lower gear carrier 68. The control member assembly 94 has a plurality of control members 96 attached to a ring 98. The ring 98 is constructed so that the control members 96 can rotate between a first position and a second position. Each control member 96 has a flange 100 that extends into a groove 102 in the upper gear carrier 72. The placement of the flange 100 within the groove 102 maintains the control members 96 in the first position. An O-ring 104 is placed around the flanges 100 to bias the control members 96 into the first position.

Each control member 96 also has a pawl 105 that extends through a slot 106 in the lower gear carrier 68. One of the control members 96 is aligned with the trigger 86, so that when the control member 96 is moved into the second position, the pawl 105 pushes the trigger 86 away from the inner shoulder 88. Rotating the trigger 86 releases the upper gear carrier 74 from the lower gear carrier 68. The first spring 48 pulls and rotates the cam 46 and opens the valve 32, allowing water to flow into the collar passage and through the openings 42.

The water toy 10 is typically operated by connecting the inlet 30 to a garden hose 12 and turning on the faucet. The valve 32 is normally closed so that water is not released from the toy 10. FIG. 3 shows the toy in the set position, wherein the valve 32 is closed and all of the control members 96 are in the first position. One of the control members 96 is aligned with the trigger 86. The trigger 86 is hidden from view so that the players do not know which control member will open the valve 32.

Figure 4:
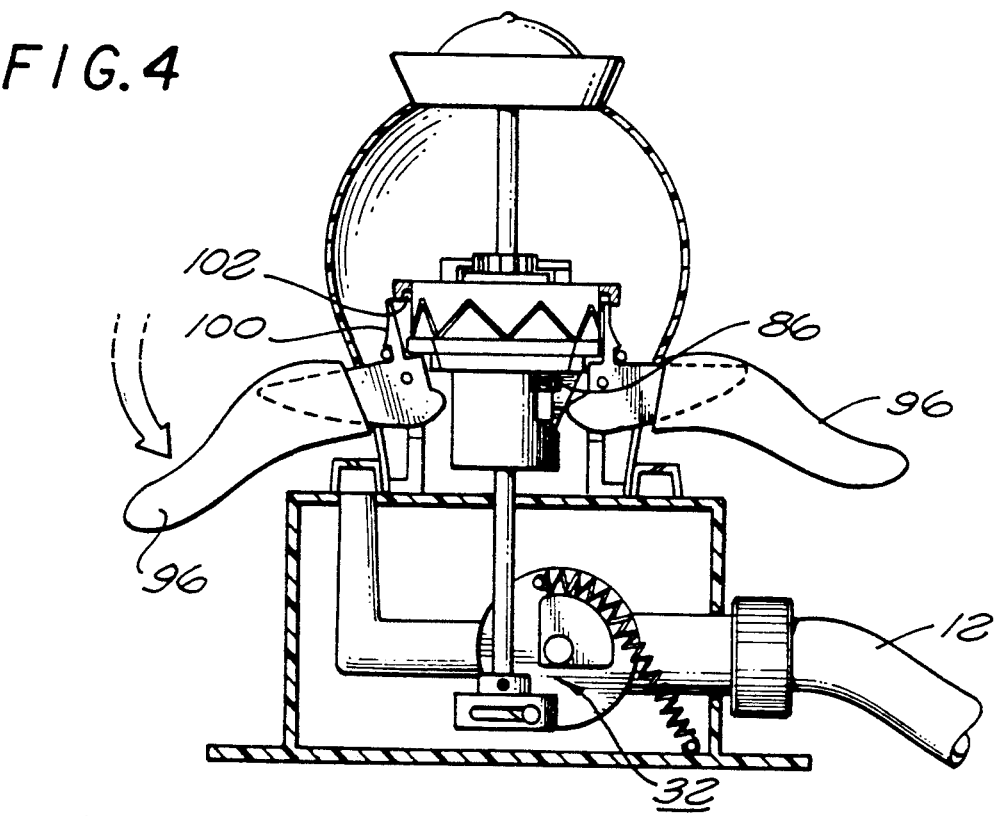
FIG. 4 is a cross-sectional view similar to FIG. 3, showing a control member pushed into a second position.

As shown in FIG. 4, a player then proceeds to push one of the control members 96 until the flange 100 disengages from the groove 102 and the member 96 rotates into the second position. Because the control member 96 is not aligned with the trigger 86, movement of the control member does not open the valve 32 and release water. Once the flange 100 disengages from the groove 102, the member 96 stays in the second position. This allows the players to know which control members 96 were previously depressed. Keeping the members 96 down builds suspense in the game. Every time a control member 96 is depressed without opening the valve, the probability for the next player to activate the toy increases accordingly. The game is played until one of the players depresses the control member 96 which is aligned with the trigger 86.

Figure 5:
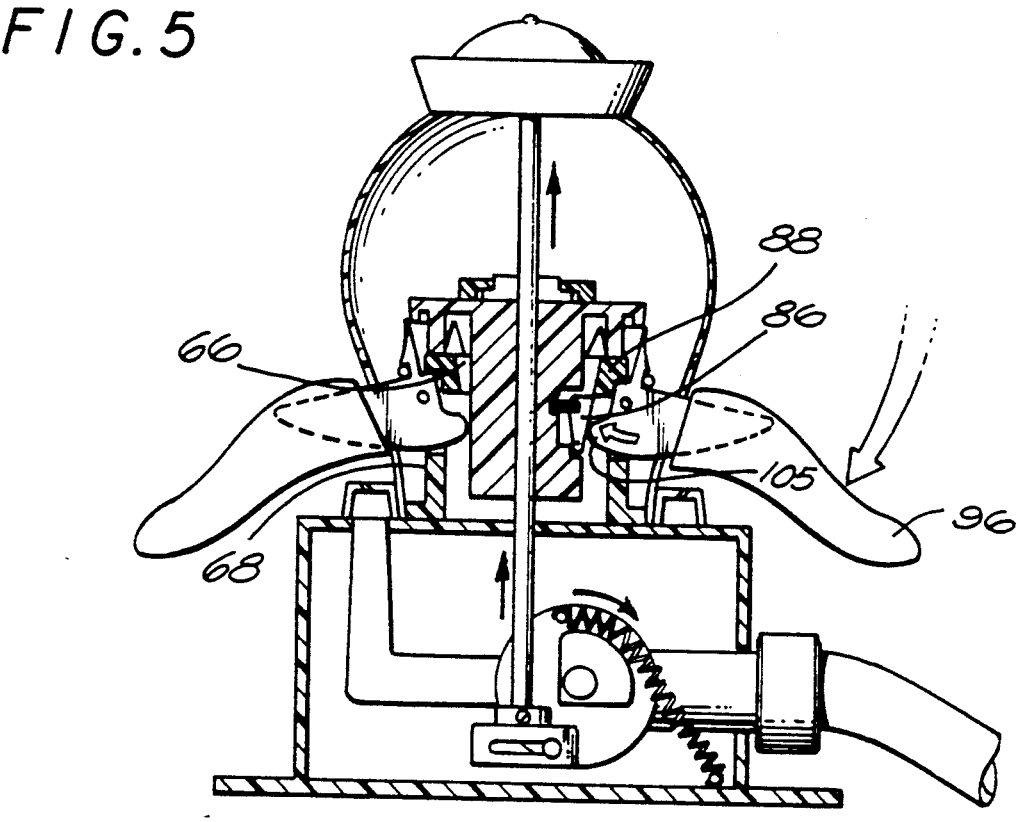
FIG. 5 is a cross-sectional view similar to FIG. 4, showing another control member that is rotated to depress a trigger.

As shown in FIG. 5, when the aligned control member 96 is rotated, the pawl 105 pushes the trigger 86 away from the inner shoulder 88, so that the trigger 86 can move through the opening 66 of the lower gear carrier 68.

Figure 6:
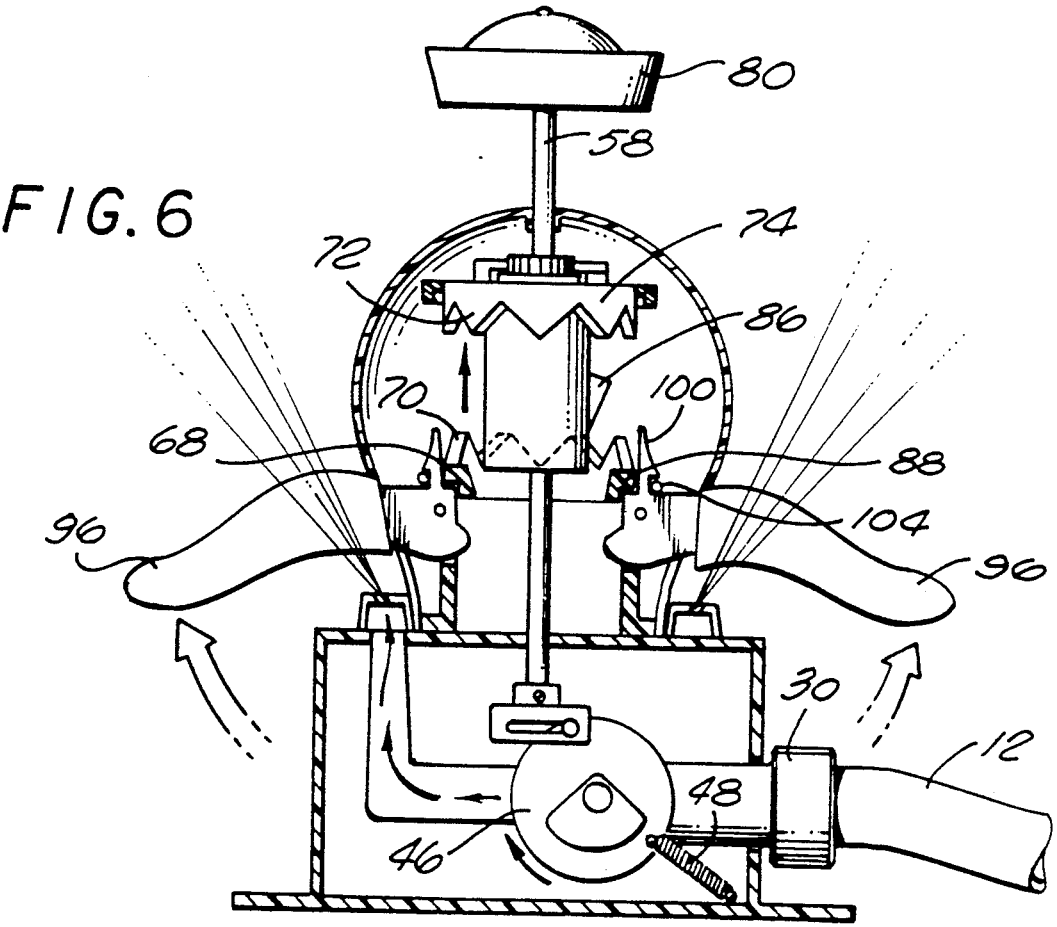
FIG. 6 is a cross-sectional view similar to FIG. 5, showing the trigger releasing a shaft assembly and opening a valve so that water flows out of the toy.

As shown in FIG. 6, when the trigger 86 is pushed away from the shoulder 88, the spring 48 rotates the cam 46 and opens the valve 32. When the valve 32 is opened, water is released from the toy 10, thereby penalizing the player who depressed the aligned control member 96.

The valve 32 can be closed by pushing the cap 80 down until the trigger 86 engages the inner shoulder 88 and locks the shaft 58 in the down position. Before the valve 32 is closed, the players can rotated the cap 80 and shaft 58 to move the trigger 86 to a new location. The trigger 86 then becomes aligned with a new control member 96.

When the upper gear carrier 74 releases from the lower gear carrier 68, the O-ring 104 moves the control members 96 back to the first position, so that the control members 96 are automatically set when the trigger 86 is reset. The teeth 70 and 72 align the carriers 68 and 74, so that the trigger 86 becomes aligned with one of the pawls 105, and is not set at some point between the control members 96, when the cap 80 is pushed into the down position. After the trigger 86 is reset the game can be repeated to provide hours of backyard fun.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A toy that is adapted to be coupled to a source of fluid, comprising:
   a housing having a fluid inlet that is adapted to be coupled in fluid communication to the source of fluid, and a fluid outlet, said housing further having a fluid passage that provides fluid communication between said fluid inlet and said fluid outlet;
   valve means for controlling the flow of fluid through said fluid passage, said valve means being constructed to be in either an open position such that fluid flows through said fluid passage, or a closed position such that fluid does not flow through said fluid passage;
   trigger means operatively connected to said valve means for controlling said position of said valve means, wherein said valve means is in said closed position when said trigger means is set, and in said open position when said trigger means is unset; and,
   at least two control members extending from said housing, said control members being adapted to move between a first position and a second position, said control members being located within said housing such that at least one of said control members unsets said trigger means when said control member is moved into said second position, and at least another one of said control members does not unset said trigger means when said another one of said control members is moved into said second position.

2. The toy as recited in claim 1, wherein said trigger means and said control members are adapted to allow relative movement between each other to vary which control member can unset said trigger means.

3. The toy as recited in claim 1, further comprising a cap that is adjacent to said housing and operatively connected to said trigger and valve means, said cap being adapted to move between a down position and an up position, wherein said valve means is closed and said trigger means is set when said cap is in said down position, and said cap is in said up position when said trigger means is unset and said valve means is open.

4. The toy as recited in claim 1, wherein said housing is constructed to simulate a head of an octopus and said control members are constructed to simulate legs of an octopus.

5. A toy that is adapted to be coupled to a garden hose, comprising:
   a housing having at fluid inlet that is adapted to be connected to the garden hose, and a plurality of fluid outlets, said housing further having a fluid passage that provides fluid communication between said fluid inlet and said fluid outlets;
   valve means for controlling the flow of fluid through said fluid passage, said valve means being constructed to be in either an open position such that fluid flows through said fluid passage, or a closed position such that fluid does not flow through said fluid passage;
   a lower gear carrier attached to housing, said lower gear carrier having an inner shoulder that defines a first opening in said lower gear carrier;
   a shaft assembly coupled to said valve means and extending through said first opening of said lower gear carrier, said shaft assembly being adapted to move between an up position and a down position, wherein said valve means is in said open position when said shaft assembly is in said up position and said valve means is in said closed position when said shaft assembly is in said down position;
   first bias means operatively connected to said shaft assembly for biasing said shaft assembly into said up position;
   a trigger pivotally connected to said shaft assembly, said trigger being adapted to engage said inner shoulder and hold said shaft assembly in said down position, said trigger being adapted to move and disengage from said inner shoulder such that said shaft assembly moves into said up position; and,
   a plurality of control members operatively connected to said housing and adapted to move between a first position and a second position, said control members being located relative to said shaft assembly such that one of said control members moves said trigger from said inner shoulder when said control member moves into said second position.

6. The toy as recited in claim 5, wherein said shaft assembly and trigger can rotate relative to said control members.

7. The toy as recited in claim 6, further comprising a cap connected to said shaft assembly and adapted to move between up and down positions, said cap being adapted to allow a player to move said shaft assembly into said down position so that said trigger engages said inner shoulder and said valve means is in said closed position.

8. The toy as recited in claim 7, further comprising alignment means operatively connected to said shaft assembly and said lower gear carrier for aligning one of said control members with said trigger.

9. The toy as recited in claim 8, wherein said alignment means includes a plurality of sawtooth shaped lower teeth extending from said lower gear carrier, and a plurality of complimentary sawtooth shaped upper teeth extending from an upper gear carrier of said shaft assembly, said upper and lower teeth being adapted to mesh and prevent rotation of said shaft assembly when said shaft assembly is in said down position.

10. The toy as recited in claim 9, wherein said control members each have a flange that extends into a groove in said upper gear carrier to hold said control member in said first position, said flange being adapted to disengage from said groove when said control member is moved into said second position.

11. The toy as recited in claim 10, further comprising third biasing means for biasing said trigger into engagement with said inner shoulder.

12. The toy as recited in claim 11, further comprising second biasing means for biasing said control members into said first position.

13. The toy as recited in claim 12, wherein said housing is constructed to simulate a head of an octopus and said control members are constructed to simulate legs of an octopus.

14. A method of playing a game by a plurality of players, comprising the steps of:
 a) providing a toy comprising a housing with a fluid inlet adapted for fluid communication attachment to a water hose, a plurality of control members coupled to said housing and being movable from a first position to a second position;
 b) attaching said toy to a water hose;
 c) moving all of said control members to said first position;
 d) releasing water from the hose into said housing wherein the first position of said control members prevents water from being released from the toy, said toy releases water when at least one of said control members is moved into said second position, while said toy does not release water when at least another one of said control members is moved into said second position;
 e) moving one of said control members into said second position;
 f) moving another one of said control members into said second position if said control member of step (e) did not release water; and
 g) repeating step f) until moving one of said control members releases water.

15. The method as recited in claim 14, further comprising the step of changing which control member will release water when moved into said second position.

* * * * *